Dec. 9, 1969 MIYAO TAKAHASHI ET AL 3,483,061

METHOD AND APPARATUS FOR PRODUCING BAGS FROM TUBULAR FILM

Filed May 13, 1966 4 Sheets-Sheet 1

INVENTORS
Miyao Takahashi
Yukihiko ITO
Katsunori YAMADA
Mitsuo AMEMIYA
By Wenderoth, Lind and Ponack
Attorneys INVENTOR.
Miyao Takahashi
Yukihiko Ito
Katsunori Yamada
Mitsuo AMEMYA
By Wenderoth, Lind and Ponack
attorneys METHOD AND APPARATUS FOR PRODUCING BAGS FROM TUBULAR FILM
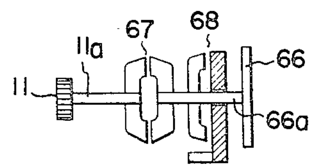
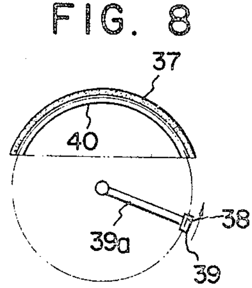
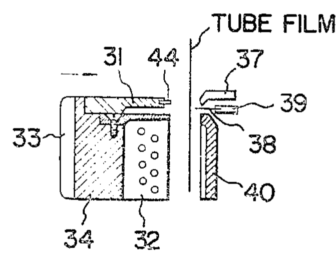
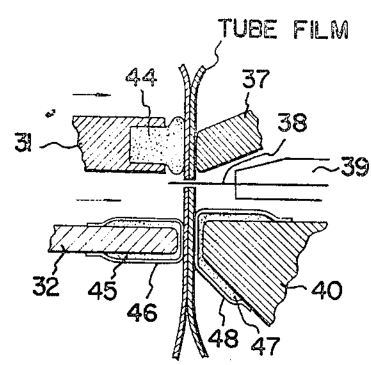
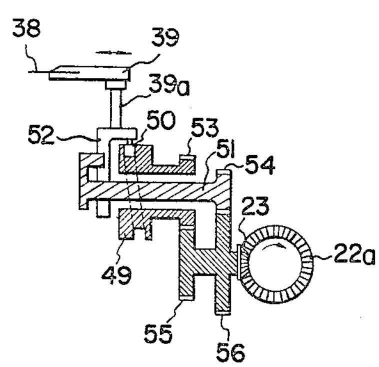
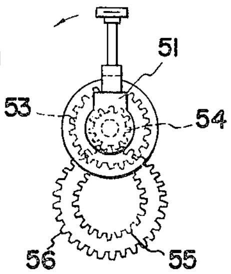
INVENTOR.
Miyao Takahashi
Yukihiko Ito
Katsunori YAMADA
Mitsuo AMEMIYA
By Wenderoth, Lind & Ponack
attorneys

METHOD AND APPARATUS FOR PRODUCING BAGS FROM TUBULAR FILM

Filed May 13, 1966 4 Sheets-Sheet 4

INVENTORS
Miyao Takahashi
Yukihiko Ito
Katsunori YAMADA
Mitsuo AMEMIYA
By Wenderoth, Lind & Ponack
attorneys United States Patent Office 3,483,061

Patented Dec. 9, 1969

1

3,483,061

METHOD AND APPARATUS FOR PRODUCING BAGS FROM TUBULAR FILM

Miyao Takahashi, Yukihiko Ito, Katsunori Yamada, and Mitsuo Amemiya, Nakoso-shi, Fukushima-ken, Japan, assignors to Kureha Kagaku Kogyo, Kabushiki Kaisha, Tokyo-to, Japan Filed May 13, 1966, Ser. No. 549,856
Claims priority, application Japan, May 17, 1965, 40/28,662; Dec. 1, 1965, 40/73,842; Dec. 2, 1965, 40/97,930
Int. Cl. B32b *31/18*
U.S. Cl. 156—380 6 Claims

ABSTRACT OF THE DISCLOSURE

Apparatus for automatically and continuously producing synthetic resin bags having bowed or convex arcuate bottom formations, from tubular film stock material of long length but folded flat and stored in wound supply roll form in conjunction with the apparatus. The film is fed vertically, arcuately cut and substantially simultaneously heat sealed, thereby giving considerably increased production on improved apparatus of narrower overall construction, and embodying novel rotary cutter means and extraction means for withdrawing the finished bags.

This invention relates to techniques in the production of synthetic resin bags. More particularly, the invention concerns a new and improved method and machine for automatically and continuously producing synthetic resin bags having bowed or convex arcuate bottoms from tubular film material stock of long length, flat folded and wound in roll form.

Bag making machines of the type referred to above known heretofore have been accompanied by certain difficulties as will be described in detail hereinafter.

An object of the present invention is to overcome these difficulties and to provide a new and improved method and machine for producing bags from tubular film whereby bags of uniform quality and neat appearance without weakened parts and other defects can be economically produced.

More specifically, an object of the invention is to provide apparatus for producing bags having five principal features, namely, an integrally combined cutting and welding mechanism capable of accomplishing cutting and welding of tubular film almost simultaneously, a novel rotating film cutter of simple construction and operation, an extraction mechanism for drawing away completed bags, a novel mechanism for unwinding and feeding under constant tension tubular film from a film roll, and an effective combination and coordination of all principal mechanisms for synchronized operation according to a constant operational cycle.

The procedure of joining two surfaces of synthetic resin sheets or films by application of pressure and high-frequency current by means of electrodes applied to the outer surfaces of the resin films is referred to in some instances as "heat sealing" but is herein termed "welding."

According to the present invention, briefly stated, there is provided a method for continuously producing bags from tubular film, characterized by the steps of: feeding a long length of tubular film of a synthetic resin in flat folded state into a cutting and welding device consisting, in combination, of a film holding element, a film cutting element, and a film welding element; carrying out successive cutting and welding cycles each comprising the steps of holding immovably the film by means of the holding element and the welding element in yet in-

2 operative state, cutting the thus held film by means of the cutting element, and transversely welding immediately thereafter by means of the welding element the film in an untensioned state thereby to form the bottom of a bag; and cooling with a jet of cool air the part of each bag thus welded.

According to the present invention there is further provided apparatus having the aforementioned five features for carrying out the above described method.

The nature, principle, and details of the invention will be more clearly apparent from the following detailed description when read in conjunction with the accompanying drawings, in which like parts are designated by like reference numerals.

In the drawings:

FIG. 7(*b*) is simplified diagrammatic view showing the essential parts of an electromagnetic clutch and electromagnetic brake suitable for use in the film feeding device in the machine shown in FIG. 7(*a*).

FIG. 8 is an elevational view of a rotating cutting blade in the direction of its rotational axis;

FIG. 9 is a side elevational view showing the relative positions of the parts of the combined film cutting and welding mechanism of the invention in opened state prior to operation;

FIG. 10 is a partial side elevational view showing the essential parts of the film holding, cutting, and welding elements according to the invention in operational state;

FIG. 11 and 12 are respectively side and end elevational views showing one example of the film cutter mechanism.

Figure 1:
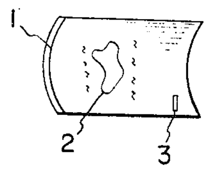
FIG. 1 is a planar view showing a unit blank cut from a tubular film for a synthetic resin bag with arcuate bottom.
Figure 2:
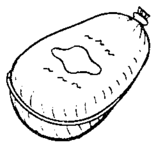
FIG. 2 is a perspective view of the same bag filled with a product.

In general, a synthetic resin bag having a convex arcuate bottom of the type with which this invention is concerned is of the shape as shown in FIG. 1 when flattened and has a weld line 1 at the arcuate bottom. When necessary, printed marks 2 and a register mark 3 for photoelectric detection are printed onto the tubular film stock material. A synthetic resin bag of this character is used for packaging products such as sausages, hams, broilers, and cheeses by placing the product into the bag and sealing the open end by suitable means such as a metal clamp means, as indicated in FIG. 2.

Figure 3:
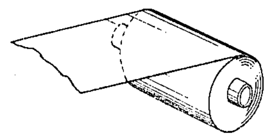
FIG. 3 is a perspective view showing the tubular film stock material for the bag shown in FIGS. 2 and 3 in the state of a roll.

Bags of this character are generally produced from tubular film stock material of substantial length which has been flat folded and prepared as a roll as shown in FIG. 3. A conventional bag making machine for this purpose essentially comprises, in combination a mechanism for unwinding a film roll, a mechanism for transversely welding the unwound film at specified intervals in the longitudinal direction of the film, a mechanism for transversely cutting the welded film either in front of or behind the weld line thereby to form bags, and a mechanism for extracting these bags thus formed and collecting them in a specified place.

Conventional bag making machines of the above description, however, have had certain disadvantages which will become apparent hereinafter, and which the present invention contemplates eliminating.

The first important feature of the present invention is its provision in a bag making machine of a welding and cutting mechanism in which a welding mechanism and a cutting mechanism are effectively combined.

When film of a vinylidene chloride resin subject to great heat shrinkage is welded in a tensioned state, the welded part is stretched because of the heat shrinkage of the region in the vicinity of the welded part, the strength of which part is reduced. Accordingly, it is necessary at the time of welding to slacken momentarily the tension in the flat tubular film and, at the same time, to cool the film.

Heretofore, the conventional practice in producing bags has been to weld transversely by means of pinch rolls the flat tubular film, which is fed intermittently by predetermined length intervals, as the tension therein is momentarily slackened, to send the welded tube as it is cooled to the succeeding station, and to cut transversely the tube in front of or behind the welded part.

Figure 4:
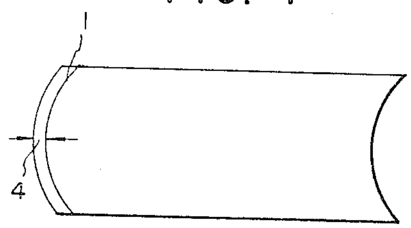
FIG. 4 is a planar view of a unit blank for a synthetic resin bag.

However, with devices accomplishing such welding and cutting at separate stations, slight differences such as those in the film traveling speed between the welding station and the cutting station, the shrinkage rate of the film, and the weld width readily cause fluctuations or deviations in the width (normally 4 to 5 mm.) of the unwelded part 4 outside of the welded part 1 as shown in FIG. 4, whereby the value of the bags as a commercial product drops.

That is, when these bags are used to package food products as illustrated in FIG. 2, excessive width of the margin 4 greatly impairs the appearance of the packaged product. Conversely, when the margin 4 is excessively narrow, the welded bottom of the bag may be cut off by the cutter in extreme cases.

Figure 5:
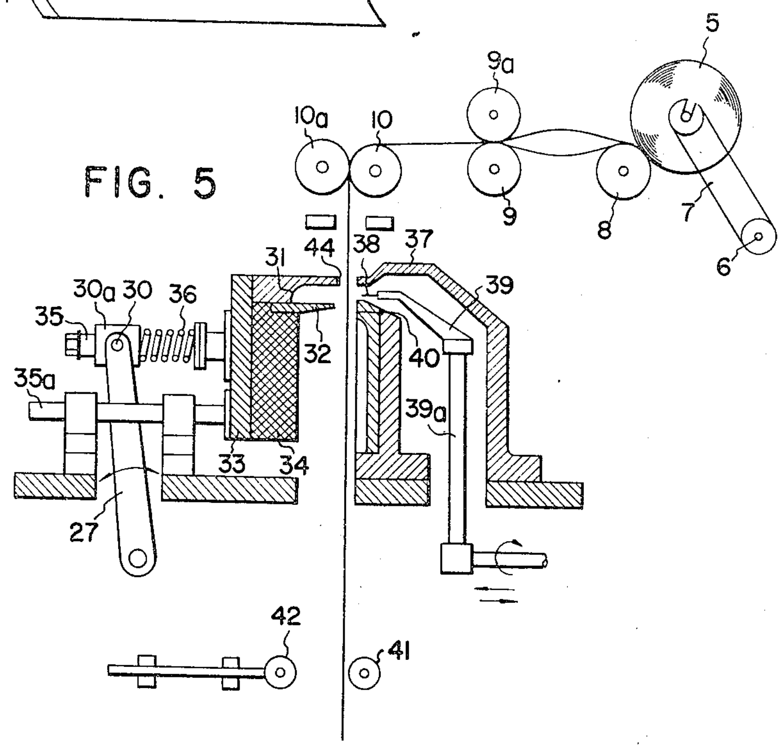
FIG. 5 is a side elevational view, partly in section, showing the essential parts of one example of a welding and cutting device constituting a principal component of a bag making machine embodying the invention.

This difficulty is overcome in the bag making machine of the invention by the provision therein of an integrated combination of a welding device and a cutting device arranged at a single station as shown in FIG. 5 and described in detail hereinafter, whereby welding and cutting are accomplished almost simultaneously, and the difference between the heating time required for film welding and the cutting time required for cutting is utilized to cause cutting to take place first and completion of welding immediately thereafter.

Since, by the practice of the present invention, the film cutting and welding are accomplished almost simultaneously, the width of the margin 4 becomes constant. Furthermore, the electrodes of the welding device first function as means for holding the film during the cutting operation and then accomplish heat welding of the film. Therefore, tension in the film is removed during welding, good welding thereby being accomplished. Moreover, since the welding and cutting are carried out at one station, only one pause in the travel of the film is required for each unit cycle of process operation, whereby the machine is simplified and can be reduced in size.

When a film which has been printed beforehand is to be used, a detection device described hereinafter is adjustably set to detect the aforementioned register mark 3, whereby the machine is synchronized to carry out welding and cutting always at a specific part of the film relative to the markings thereon. As a result, bags of uniform and neat finish can be produced.

The second important feature of the bag making machine of the invention resides in its novel film cutter.

The cutters in bag making machines known heretofore have been designed to effect shearing cuts in almost all cases. In order to make curvilinear cuts such as arcuate cuts by means of curvilinear shear blades in a tubular film of soft synthetic resin which is of the order of $\frac{2}{100}$ mil with no appreciable rigidity, it is necessary to finish the two shear (scissor) blades with a precision such as to produce a blade clearance of the order of a number of thousandths of millimetres. It has been almost impossible to fulfil this requirement.

The present invention overcomes this difficulty by providing a cutter comprising a blade holder 39 which is rotated continuously at high speed and a razor blade 38 mounted on the tip of the holder 39, as shown in FIG. 5. The holder 39 is advanced toward the tubular film only at the time of cutting, which is accomplished by a wedge cutting action. Accordingly, the cutter has advantages such as simple construction and ease of replacement of the razor blade 38.

The third important feature of the bag making machine of the invention resides in a mechanism for drawing away or extracting the bags which have been cut and welded.

During the production of bags by cutting and welding of the tubular film, the bags tend to adhere to the welding device, cutting device, and other machine parts and to interfere with the succeeding operation. In order to prevent this occurrence, it is necessary to grasp and draw away the bags periodically from the cutting and welding device.

An extraction device suitable for this purpose must fulfil the operational requirements of permitting smooth and positive introduction thereinto of each soft bag, grasping the central part of the bag only at the time of extraction thereof, rapidly drawing away the bag, and after extraction, immediately clearing the path of the bags so as not to interfere with the movement of the succeeding bag.

These requirements are fulfilled by the bag extraction device according to the present invention which comprises, essentially, the combination of a continuously rotating roller 41 with stationary axis disposed on one side of the bag path and a free roller 42 rotatably mounted on one end of a push rod on the opposite side of the bag path. During the advance movement of the tubular film, the roller 42 is retracted to open widely the bag path and advances only at the time of extraction to clamp a bag between itself and the fixed-axis roller 41, whereby the bag is drawn away by the rotation of the roller 41, the roller 42 retracting thereafter. This operation of the roller 42 is synchronized with the bag making operation thereby to accomplish positive and rapid extraction of the bags.

The fourth important feature of the present invention resides in a mechanism for unwinding and feeding the tubular film from a film roll.

During the unwinding of tubular film from a film roll, it is necessary that the tubular film be supplied always under a constant tension. However, the weight and wound diameter of the film roll progressively decreases as the roll unwinds. As a result, the unwinding torque varies, and this naturally causes a variation in the tension in the film. Numerous devices have been proposed heretofore for compensating for such variation in the tension in film material due to variation in the weight and rolled diameter of the film roll. Almost all of these devices, however, have been accompanied by difficulties such as complication of operation and high cost of manufacture.

According to the present invention there is provided a simple mechanism comprising, essentially, arms 7 freely rotatable at one end about a pivot 6 and rotatably supporting at their other end the film roll 5 and a power-driven unwinding pinch roll 8 against which the film roll is caused to press naturally under a force due to gravity, as shown in FIG. 5. Accordingly, as the film roll diameter decreases, the angle between the arms 7 pivoted at pivot 6 and the horizontal plane through the pivot 6 decreases. The dimensions and positions of the parts of this mechanism are so selected that, as the net effect of the variation of the force between the film roll 5 and the pinch roll 8 and the variation of the weight of the film roll 5, the unwinding torque is maintained approximately constant, whereby the variation of the tension in the tubular film due to unwinding is compensated for, and the film tension is maintained constant.

The fifth important feature of the invention resides in the effective combination of the above described mechanisms with other mechanisms as, for example, a film length setting mechanism, for synchronized operation according to a constant operational period, as described more fully hereinafter.

Figure 6:
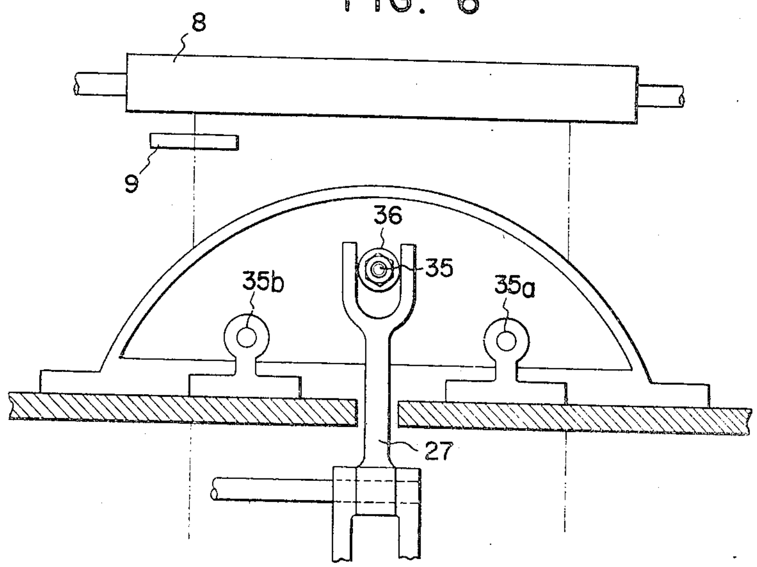
FIG. 6 is an end elevational view, with parts cut away and some parts deleted, of the device shown in FIG. 5 as viewed from the left.
Figure 7A:
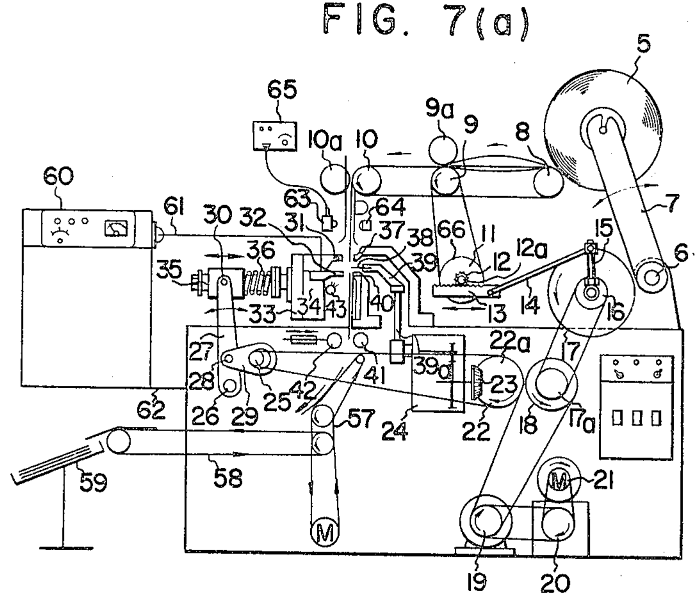
FIG. 7(*a*) is general side elevational view schematically showing the essential parts of one example of the bag-making machine of the invention.

Referring first to FIGS. 5, 6, and 7(*a*), the above described powered unwinding roll 8 is intercoupled by a chain drive with a pinch roll 9 operating cooperatively with a roll $\mathbf{9_a}$ disposed thereabove to pinch the tubular film a certain distance downstream from the roll 8. The pinch rolls 9 and $\mathbf{9_a}$ are intercoupled by timing gears and pressed together by spring means (not shown). Further downstream, there are provided another pair of pinch rolls 10 and $\mathbf{10_a}$ similarly intercoupled by timing gears and pressed together by spring means (also not shown). The rolls 10 and 9 are intercoupled by a chain drive. Accordingly, the rolls 8, 9, $\mathbf{9_a}$, 10, and $\mathbf{10_a}$ rotate synchronously.

These rolls 8, 9, $\mathbf{9_a}$, 10, and $\mathbf{10_a}$ are driven by power supplied by a motor 21. The power of the motor 21 is transmitted through a speed-changing mechanism 20, a speed-reducing mechanism 19, counters 18 and 17, a crank shaft 16, a variable crank arm 15, and a connecting rod 14 to cause a toothed rack 13 to reciprocate. The reciprocation of the rack 13 is transmitted to a pinion 12 meshed with the rack 13 and having a pinion shaft provided with a cam clutch $\mathbf{12_a}$ which transmits only power causing the roll 9 to rotate in the arrow direction as shown in FIG. 7(*a*). The power originating in the motor 21 is thus transmitted to the roll 9.

In this manner, the synthetic resin tubular film in flat folded and rolled state in the roll 5 is unwound and supplied intermittently by a specified length of feed for each operational cycle and is introduced into position between electrodes 32 and 40 of arcuate shape.

We have found that introduction of air into the tubular film from the roll 5 between the roll 8 and the pinch rolls 9 and $\mathbf{9_a}$ to inflate the tubular film is effective in separating the closely cohering inner surface of the tubular film. We have found further that good results can be achieved by changing slightly the relative speed relationships of the rolls 8, pinch rolls 9 and $\mathbf{9_a}$, and pinch rolls 10 and $\mathbf{10_a}$ in accordance with the properties of the tubular film.

During the time interval in which the cam clutch $\mathbf{12_a}$ is not transmitting power to the roll 9 because of the reciprocating motion of the rack 13 accompanying the rotation of the crank arm 15, all of the above mentioned rolls are stopped. During this time, the power from the motor 21 is transmitted through the counter shaft $\mathbf{17_a}$ and a sprocket 22 to an eccentric cam 25 engaged with a follower 29 which is pin connected at an intermediate point 28 of an arm lever 27 pivoted at its lower end at pivot 26, whereby the lever 27 is caused to oscillate.

The upper free end of the lever 27 is pin connected by pin 30 to a collar $\mathbf{30_a}$ fitted around a rod 35, which, together with a mounting plate 33, insulating plate 34, and spring 36, constitutes an oscillating assembly supporting a positive electrode 32 and a clamp plate 31. The relative positions of the eccentric cam 25 and the crank arm 15 are so set that, during the aforementioned time interval of no movement of the rolls, the above described oscillating assembly is moved to the right as viewed in FIGS. 5 and 7(*a*) by the movement of the lever 27 transmitted through the collar $\mathbf{30_a}$ and spring 36.

Consequently, the positive electrode 32 is abutted against a negative electrode 40, and further rightward movement thereafter of the lever 27 results in a compression of the spring 36 whereby the positive electrode 32 is pressed toward the negative electrode 40.

In addition to the rod 35, rods $\mathbf{35_a}$ and $\mathbf{35_b}$ are fixed to the mounting plate 33 and are slidably fitted in guide brackets, whereby the positive electrode 32 and clamp plate 31 are guided in horizontal reciprocating movement.

On one hand, power from a bevel gear **22*a* fixed to the shaft of the aforementioned sprocket 22 is transmitted by way of a bevel gear 23 to a gear box for transmitting power to the film cutter. An arm $\mathbf{39_a}$ supporting the aforementioned blade holder 39 and the holder 39 holding the razor blade 38** at its tip are thereby rotated. When the arm $\mathbf{39_a}$ is advanced leftwardly as viewed in FIGS. 5 and 7(*a*), the blade 38 is thereby caused to cut the tube film, traveling between the negative electrode 40 and the stationary plate 37 of a film holding device as indicated in FIG. 8.

The relative positions of the rotating razor blade 38, blade holder 39, negative electrode 40, stationary film holding plate 39, positive electrode 32, moving film holding plate 31, sponge-like padding 44 on the forward edge of the plate 31, insulating plate 34, and mounting plate 33 at the time when the tube film descends are indicated in FIG. 9.

FIG. 10 indicates the state wherein the positive electrode 32 and moving film holding plate 31 have advanced rightwardly as viewed in FIG. 9 to clamp the tube film between themselves and the negative electrode 40 and stationary film holding plate 37, and rotating blade 38 is cutting the tube film. As mentioned above, the forward edge of the film holding plate 31 is provided with a padding 44 made of a sponge-like material which is imbeddedly secured thereto. Furthermore, the contact edges of the positive electrode 32 and negative electrode 40 are respectively covered with rubber sheets 45 and 47 and Teflon films 46 and 48 bonded thereon.

In the cutting and welding operation of the above described parts, the tube film is first clamped between the padding 44 and the stationary film holding plate 37 and then clamped between electrodes 32 and 40 exerting pressure through rubber sheets 45 and 47 and Teflon films 46 and 48. Then, before a sufficient quantity of high-frequency current has flowed between the electrodes 32 and 40, the rotating razor blade 38 cuts the tube film, whereby the tube film is already cut by the time sufficient current flows between the electrodes to cause the weld surfaces of the tube film to melt. Therefore, the margin 4 as shown in FIG. 4 from the weld line to the extreme edge of each bag can freely shrink, whereby weakening of the bag material at the weld line is prevented.

High-frequency current for welding is supplied by a high-frequency oscillator 60 connected by a conductor line 61 to the positive electrode 32 and by a conductor line 62 to the negative electrode 40. The oscillator 60 is synchronized with the cutting and welding mechanism to supply a suitable quantity of high-frequency current through the electrodes 32 and 40 when they have clamped and pressed the tube film therebetween.

After this cutting and welding step, the electrodes and film holding plates are separated, and the bag is permitted to drop. However, the bag tends to adhere to Teflon films 46 and 48 in some cases, whereupon the aforedescribed bag extraction device operates to extract the bag in a compulsory manner through the action of the stationary axis roller 41 operating cooperatively with movable roller 42 as described hereinbefore. The surfaces of the rollers 41 and 42 are preferably covered with a sponge-like material. Each bag thus extracted is conveyed on belt conveyors 57 and 58 to a product container 59.

One example of mechanism for the film cutter is illustrated in FIGS. 11 and 12. As shown, a bracket 52 supporting the blade holder arm $39_a$ is embraced and rotated by one end of a rotating driving shaft 51. At the same time, a cam follower roller 50 rotatably secured to the bracket 52 is engaged with the groove of a groove cam 49 and is caused by the groove to move in the axial direction of the driving shaft 51. The cam 49 is integrally and coaxially formed with a hollow shaft concentrically disposed around the shaft 51 and with a gear 53 fixed to the hollow shaft. The gear 53 is meshed with a gear 55 fixed to the same shaft as a gear 56 which is meshed with a gear 54 fixed to the other end of the shaft 51. The aforementioned bevel gear 23 is fixed to the same shaft as the gears 55 and 56.

The gear ratios of the above described mechanism are so selected that, during ½ revolution of every 4 revolutions of the razor blade 38 mounted on the blade holder 39, immediately after the tube film has been clamped by the film holding plates 31 and 37, the blade 38 is advanced leftwardly to cut the film along an arcuate cutting line.

Figure 13:
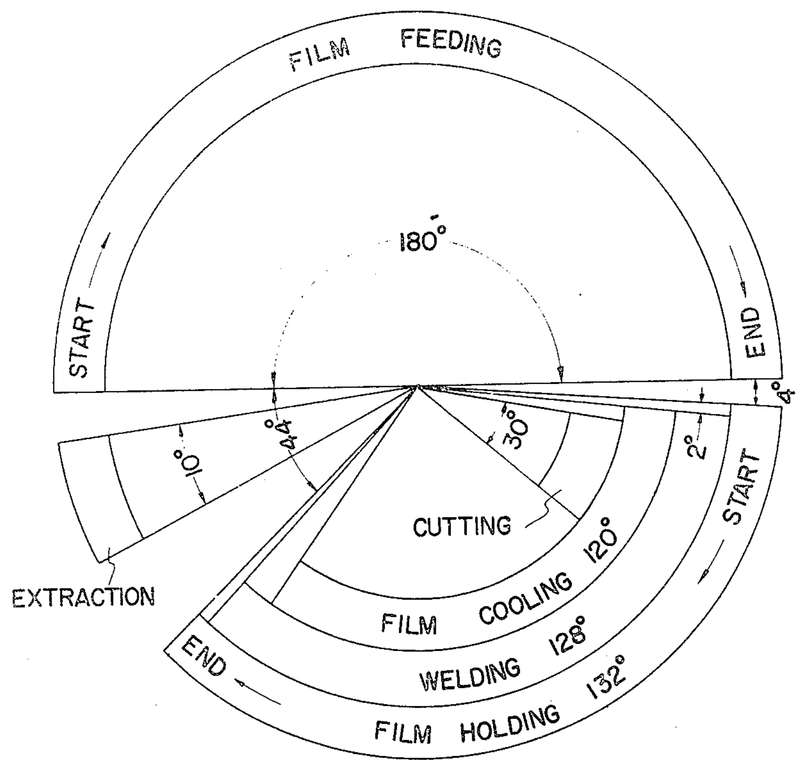
FIG. 13 is a cyclic time chart indicating the timing relationships of the various process operations.

The time relationships of the operations of the various parts described above will now be described with reference to FIG. 13. During 180 degrees of rotation of the aforementioned crank shaft 16, film feeding takes place. During this period both welding electrodes 32 and 40 are separated, and the rotating blade 38 is also retracted from the path of the tube film and is rotating.

Next, after a slight interval of time, the movable film holder 31 and the positive electrode 32 are advanced to start welding, whereupon air is simultaneously ejected from small holes in a polyvinyl chloride pipe 43 as shown in FIG. 7(*a*) to cool the weld surface. Cutting is accomplished in a short period at the initial period when welding starts and, therefore, is completed by the time the welding progresses to the state where the weld surfaces become molten. Accordingly, as mentioned hereinbefore, the marginal part 4 as shown in FIG. 4 is permitted to shrink freely, whereby loss of strength at or near the weld line is prevented.

Thereafter the extraction rollers 41 and 42 operate to grasp and extract the finished bag, which thereby is dropped onto the conveyor 56. In the above described manner, synthetic resin bags having arcuate bottoms are produced in accordance with the invention.

In the case where bags with arcuate bottoms as shown in FIG. 1 are to be produced from a roll of tube film stock with printed marks spaced at constant intervals thereon, it is desirable that the marks appear at the same position on all bags. For this purpose, register marks 3 are printed on the tube film so that they will pass between a photocell 63 and a lamp 64 as shown in FIG. 7(*a*). The output of the photocell 63 is amplified by an amplifier 65 into an amplified signal for activating an electromagnetic clutch 67 between the aforementioned pinion 11 for film feeding and a sprocket 66.

Thus, each time the light from the lamp 64 is interrupted by a register mark, the variation in incident light is detected by the photocell 63, whereby the electromagnetic clutch 67 is released and an electromagnetic brake 68 is applied to stop the aforedescribed rolls 8, 9, $9_a$, 10, and $10_a$, and cutting and welding are carried out to produce a bag with printed markings in their correct position.

One example of mechanical arrangement of the pinion 11, its shaft $11_a$, sprocket 66, its shaft $66_a$, electromagnetic clutch 67, and electromagnetic brake 68 is illustrated in FIG. 7(*b*).

In order to position the printed marks at the desired position on each bag, the photocell 63 and lamp 64 are so mounted as to be vertically adjustable.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. Apparatus for continuously producing bags from tubular film comprising means to feed a long length of tubular film of a synthetic resin in flat folded state and a combined film cutting and welding device for carrying out successive cycles of cutting and welding operations on the tubular film thus fed, said device comprising, essentially, a film holding element, a film cutting element including a high speed rotary blade and high frequency electrodes constituting a film welding element, said cutting element operating during each cutting and welding cycle to cut transversely the tubular film as said film is immovably held by the holding element and by high frequency electrodes prior to the current passing therein reaching a peak value, means for immediately imparting a current of peak value to the electrodes as they are moved closer together thereafter to weld transversely the thus cut film in an untensioned state thereby to form the bottom of a bag.

2. Apparatus as defined in claim 1 for continuously producing bags, wherein the apparatus for feeding, cutting and welding the film is positioned relatively to feed, cut and weld the film while it passes in a vertical manner through the apparatus, thereby providing an improved and more compact overall apparatus.

3. Apparatus as defined in claim 2 further including means to cool with a jet of cool air the part of each bag thus welded.

4. An apparatus for continuously producing bags from tubular film comprising: a feeding mechanism for intermittently feeding a constant length for each operational cycle of a long length of a tubular film of a synthetic resin folded flat and reeled in the form of a film roll, said feeding mechanism being provided with means to cause the film roll to press, under the force of gravity, against an unwinding roll thereby to maintain constant the component of the weight of the film roll imparted to the film when it is being unwound; a combined cutting and welding mechanism including means for cutting the film arcuately and into pieces of constant length and almost simultaneously welding one end of each piece to form a bag with an arcuate bottom during each operational cycle, said cutting and welding mechanism comprising a film holding element, a film cutting element including a high speed rotary blade, and high frequency electrodes constituting a film welding element, said cutting element operating during each operational cycle to cut transversely the film as said film is immovably held by the holding element and by high frequency electrodes prior to the current passing therein reaching a peak value, means for immediately imparting a current of peak value to the electrodes thereafter to weld generally transversely the thus cut film thereby to form the arcuate bottom of a bag; an extraction mechanism for drawing out bags from the cutting and welding mechanism, said extraction mechanism comprising a continuously rotating powered roller with stationary axis and a free roller with movable axis for clamping the bags therebetween; and means to synchronise the operations of said feeding, cutting and welding, and extraction mechanisms in accordance with said operational cycle.

5. Apparatus for continuously producing bags from tubular film comprising means to feed a long length of tubular film of a synthetic resin in flat folded state and a combined film cutting and welding device for carrying out successive cycles of cutting and welding operations on the tubular film thus fed, said device comprising, essentially, a film holding element, a film cutting element including a high speed rotary blade and high frequency electrodes constituting a film welding element, said cutting element operating during each cutting and welding cycle to cut transversely the tubular film as said film is immovably held by the holding element and by high frequency electrodes prior to the current passing therein reaching a peak value, means for immediately imparting a current of peak value to the electrodes thereafter to weld transversely the thus cut film in an untensioned state thereby to form the bottom of a bag, and wherein the film cutting element further comprises a cutting blade mounted on the outer end of a rotating arm which rotates at high speed around an axis perpendicular to the plane of the film to be cut, the plane of rotation of the cutting blade being advanceable in accordance with a desired synchronization program into position for cutting the film.

6. The apparatus as claimed in claim 5 wherein said high frequency electrodes constituting the film holding element and the film welding element are of arcuate configuration and are mutually spaced as closely as possible yet leave sufficient clearance to permit said cutting blade to cut the film held therebetween.

References Cited

UNITED STATES PATENTS

| | | | |
|---|---|---|---|
| 2,488,212 | 11/1949 | Lloyd | 156—306 |
| 2,749,020 | 6/1956 | Baxter | 156—499 |
| 3,192,095 | 6/1965 | Doyen et al. | 156—510 |

DOUGLAS J. DRUMMOND, Primary Examiner

U.S. Cl. X.R.

156—510, 583